April 21, 1959

G. A. LYON 2,882,852

METHOD OF MAKING A SPOKED WHEEL COVER

Filed June 24, 1954

Inventor
GEORGE ALBERT LYON by Hill, Sherman, Meroni, Gross & Simpson Attys.

April 21, 1959 G. A. LYON 2,882,852
METHOD OF MAKING A SPOKED WHEEL COVER
Filed June 24, 1954 2 Sheets-Sheet 2
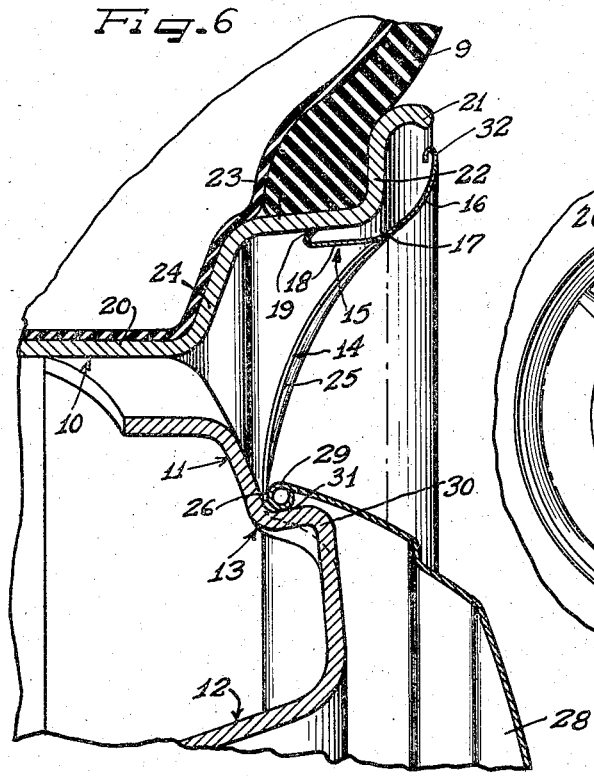
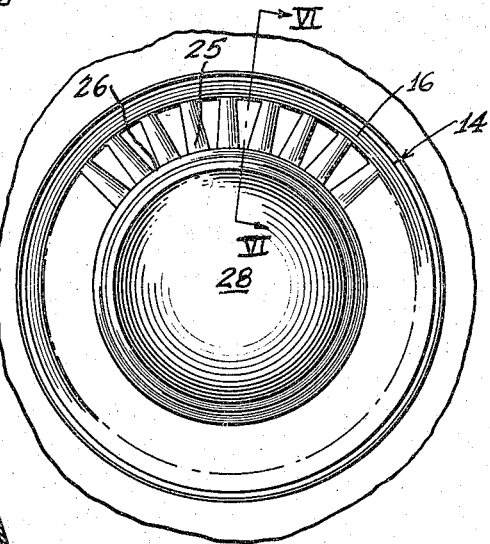
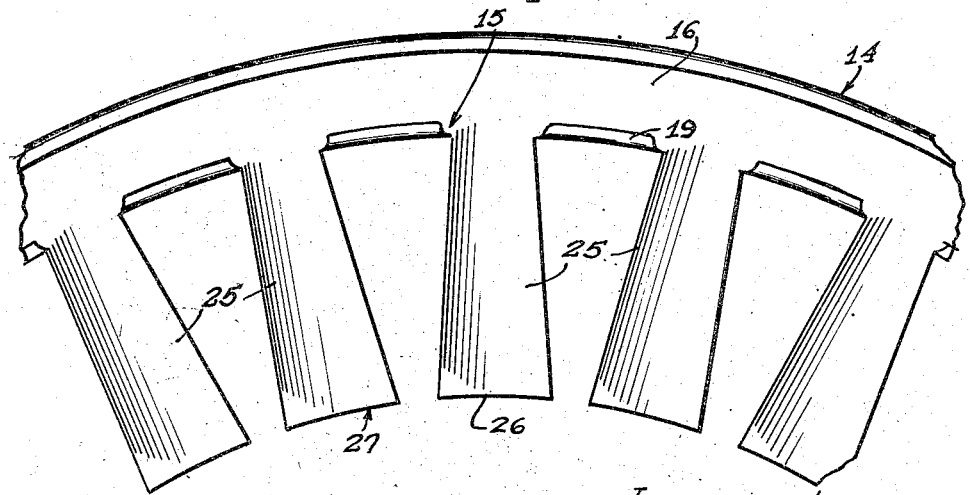
Inventor
GEORGE ALBERT LYON യ
United States Patent Office 2,882,852
Patented Apr. 21, 1959

2,882,852

METHOD OF MAKING A SPOKED WHEEL COVER

George Albert Lyon, Detroit, Mich.

Application June 24, 1954, Serial No. 438,992

6 Claims. (Cl. 113—116)

This invention relates to automobile wheel covers and more particularly to a method of making a spoked wheel trim ring.

An object of this invention is to provide a highly simple method of manufacturing a spoked wheel trim ring which lends itself to the economical manufacture of such trim rings or covers on a large production basis.

Still another object of this invention relates to the provision of simplified steps of contemporaneously forming out of a circular blank having the margins preformed and the ends joined, two trim rings of the spoked variety, each trim ring having retaining means provided thereon.

In accordance with the general features of this invention there is provided, in a method of making ornamental circular spoked trim, the steps of rolling an annular ring with a cross-sectional shape such that the margins are curved radially outwardly, slitting an intermediate portion of the ring between the edges along a tortuous path between said margins to separate the ring into two trim sections with alternate portions formed as opposing projecting free-ended transverse spokes, one set projecting in one direction from one section and the other set in an opposite direction from the other section, and turning portions on each section alternating with the spokes thereof into radially outwardly projecting trim retaining fingers located adjacent the marginal portion of the ring section and radially outwardly of the free ends of the spokes.

Other objects and features of this invention will more fully appear from the following detailed description taken in connection with the accompanying drawings and in which:

Figure 5 is a fragmentary side elevational view of an automobile wheel structure with a trim ring equipped with my novel spoke-like elements;

Figure 6 is an enlarged fragmentary cross-sectional view taken substantially on the line VI—VI of Figure 5 looking in the direction indicated by the arrows; and Figure 7 is a fragmentary side view of my novel wheel trim ring as viewed from the axially inner or underside portion of the ring.

As shown on the drawings:

Figure 1:
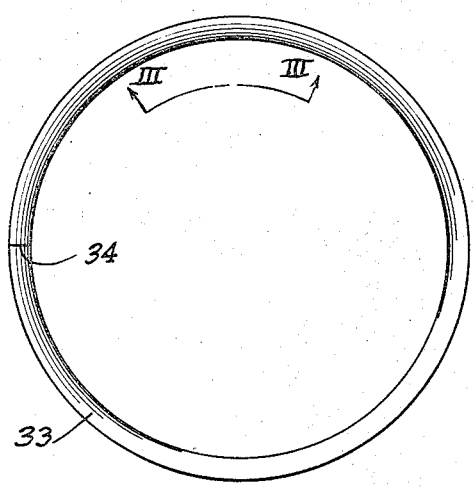
Figure 1 is an edge view of an annular ring having preformed margins showing how the ends are suitably secured to form a ring.

Since it is believed that my novel method will be best understood by first describing the article or wheel cover made by my method and its manner of cooperation with the wheel, I will first refer to Figures 5, 6 and 7.

The wheel illustrated in the accompanying drawing is of a so-called conventional drop center type and includes the usual pneumatic tire and tube assembly 9, a multi-flange tire rim 10 and a central dished wheel body or spider 11 on which the base of the rim is secured and carried. The central portion of the body part 11 is dished at 12 for detachably fastening in the usual way to the brake drum (not shown) or the like on an automobile axle. Any suitable means, such, for example, as bolts or capscrews (not shown) may be used for holding the wheel in place.

It will be best seen in Figure 6 that the central body part 11 has a protruding central annular shoulder 13 which will be discussed in detail in connection with providing retaining means for the subject of my invention.

My invention is concerned with providing a dress or appearance for this wheel which will cause it to look like an entirely different wheel, or, more specifically, like the revived conventional wire spoke wheel.

Now, I have designated generally my novel wheel trim ring by the reference character 14. It may be made from any suitable sheet material, although I preferably propose to make it in the form of a metallic annulus rolled or stamped from sheet or strip steel, such, for example, as stainless steel strip. I not only propose to provide a wire spoke simulating rim but also, in addition, I propose to provide the trim 14 with integrally spaced retaining fingers or clips 15 projecting axially inwardly from an outer radially axially inwardly sloping peripheral annular portion 16 constituting a substantial part of the trim 14. The fingers 15 are all identical so that a description of one suffices for all.

While it is obvious many different types of trim retaining fingers might suitably be employed with my novel trim 14, I have, for purposes of exemplification, illustrated a preferred type of retaining finger or clip 15.

It will be best seen from Figure 6 that my retaining finger 15 is integrally connected at 17 to the annular portion 16. The finger 15 comprises a generally axially extending leg 18 terminating in a relatively stiff short angular leg 19 turned and inclined generally radially outwardly over the longer leg 18 for ring retaining engagement with tire rim 10.

In Figure 6 the tire rim 10 is of a stepped construction and is suitably fastened at 20 to the central wheel body part 11. The rim 10 comprises an axially outer terminal flange 21 integrally and successively connected to a radially extending flange 22, an axially extending intermediate flange 23 and a third generally radially extending flange 24 leading to the connection 20 holding the rim 14 and the wheel body 11 together.

From Figure 6, it will be perceived that the terminal leg 19 of each of my retaining fingers 15 is adapted to progressively slide along the intermediate flange 23 for holding the trim ring 14 in detachable resilient trim retaining engagement with the rim 10. The gripping edges of finger legs 19 are normally all substantially disposed in a common circle of a diameter slightly greater than that of the portion of rim flange 23 engaged thereby so as to require stressing of the fingers as they are forced along the surface of inclined flange 23 in the application of the trim ring to the wheel.

Referring now to the spoke construction in Figure 5 my novel trim ring 14 is shown as being provided with a plurality of generally radially inwardly extending resilient spoke simulating elements 25 connected to the radially outer annular portion 16.

Figure 7 illustrates how the spokes 25 have been circularly spaced so as to alternate with the underturned resilient fingers 15; the material cut from between the spokes being employed to form the fingers or clips 15.

In Figures 6 and 7 the inner ends 26 of the spokes 25 form an interrupted inner circular surface 27 adapted, when engaged on the wheel body part 11, to rest or bottom on the annular shoulder 13 of the wheel body part 11.

After the trim 14 has been pushed axially onto the wheel and firmly secured to the rim 10 by the retaining fingers 15, and the spokes 25 have been bottomed against the shoulder 13 of the body part 11, the shoulder 13 is further adapted to receive a hub cap 28.

The sheet metal hub cap 28 has on its outer periphery a curled under continuous annular resilient edge 29, which is adapted to be forced over spaced bumps 30 on the body part 11 into resilient detachable engagement therewith. Each of the bumps 30 is undercut at 31 adjacent shoulder 13 so that the resilient edge 29 of hub cap 28 can drop into same for tight retaining engagement with the bumps.

It is seen in Figure 6 that as the hub cap 28 is forced into bottomed relation relative to the shoulder 13, it also clampingly engages the radially inner ends 26 of the spokes 25 thereby to resiliently wedge the ends 26 against the body part 11.

The hub cap 28 is easily detachable from gripping engagement with bumps 30 by inserting the end of a screw driver (not shown) under edge 29 and by forcibly dislodging said edge from said bumps 30.

The trim ring 14 has a reinforced turned outer edge 32 normally spaced from terminal rim flange 21 when the ring is on the wheel. This edge serves as a pry-off edge under which the end of a screw driver may likewise be inserted for prying the ring off of the wheel after removal of hub cap 28. Such a pry-off force serves to deflect resiliently the fingers 15 from gripping engagement with rim flange 23 without permanently distorting the fingers so that the ring can be repeatedly applied to and removed from the wheel if so desired.

My invention is particularly concerned with the forming and shaping of retaining fingers 15 and spokes 25 from an annular ring 33 so as to form contemporaneously substantially identical wheel trim rings 14—14 from the single annular ring 33. I shall now proceed with the description of how the trim rings 14 are formed, referring particularly to Figures 1, 2, 3 and 4. Further, for purposes of simplification, I have used, wherever possible, the same reference numerals as in the foregoing description of the article.

Figure 2:
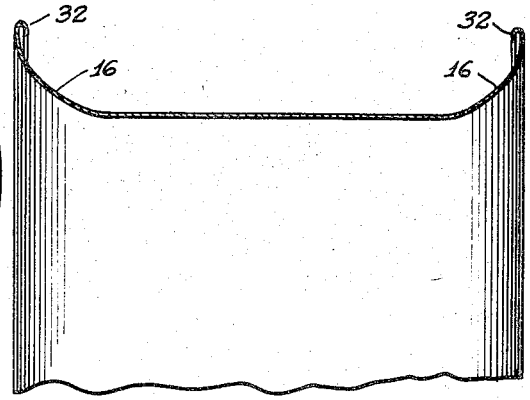
Figure 2 is a fragmentary cross-sectional view taken on the line II—II of Figure 1 looking in the direction of the arrows, showing the margins formed in accordance with an initial step of my invention.
Figure 3:
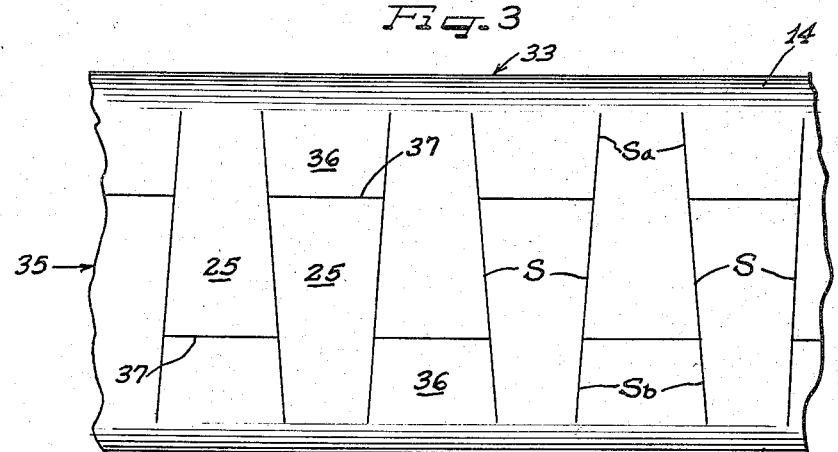
Figure 3 is an enlarged fragmentary top view showing how the ring is separated into two similar trim sections each of the sections having respective spokes and retaining means contemporaneously formed by the slitting operation.

Initially, a strip of sheet stock is rolled or stamped so as to form to shape the sloping peripheral annular portions 16—16 and the reinforced turned outer edges 32 as shown in Figure 2.

The strip, if rolled, is then cut into appropriate trim-sized lengths and butt-welded at 34 (Figure 1) to form an annular ring 33.

Thereafter, the intermediate portion 35 of annular ring 33 is stamped along a tortuous path, thus cutting or slitting the ring 33 into two trim sections or rings 14—14. By cutting the intermediate portion 35 of the annular ring 33 along a tortuous or serpentine path, alternate oppositely projecting free-ended transverse spokes 25—25 are formed, one set of spokes 25 projecting in one direction from the trim section 14 and the other set of spokes 25 in an opposite direction from the other trim section 14.

Contemporaneously with the forming of the spokes 25—25, finger stock portions 36—36 are alternately cut or slit on the intermediate portion 35 of the annular ring 33. It will be noted in Figure 3 that each of the finger stock portions 36 is cut or slit directly opposite the spoke-ends 37 located on the opposite trim section 14 and vice versa for the other finger stock portions 36 and spoke ends 37.

The slotting may be effected in any suitable manner either in one or a series of cutting or shearing operations. Divergent slits S—S define the edges of spokes 25—25 and pairs of extensions $S^a$—$S^b$ of said slits S—S define in each ring section 14 the portions 36—36 to be formed into fingers 15.

After the separation of the annular ring 33 into two trim sections 14—14, the respective spokes 25—25 and finger stock portions 36—36 are formed into final shape.

Figure 4:
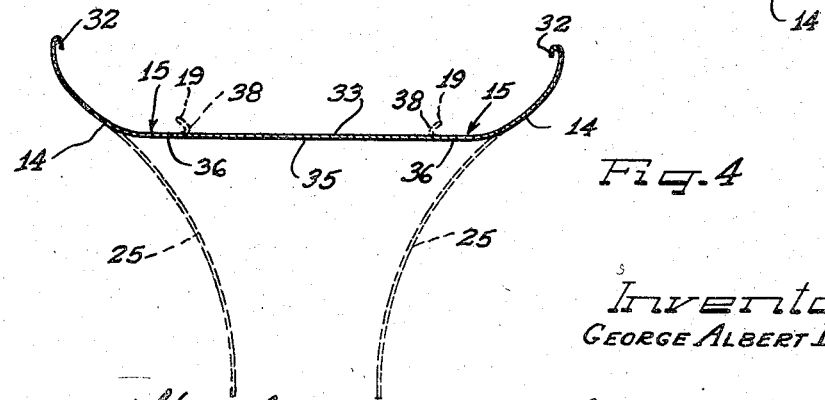
Figure 4 is a cross-sectional view taken on the lines IV—IV of Figure 3 looking in the direction indicated by the arrows and showing in dotted lines how the spokes and fingers appear in accordance with later steps of my invention.

In Figure 4 it will be seen by the dotted lines that each of the spokes 25—25 is subsequently bent from a generally axially extending direction to a radial direction in order to be capable of bottoming, when positioned on the wheel, against the shoulder 13, as shown in Figure 6.

Each of the ends 37 of finger portions 36 is underturned at 38 to provide generally radially outwardly obliquely extending stiff short angular legs 19, the finger portions 36 and the legs 19 comprising the retaining fingers 15.

At or about the same time of the shaping of the fingers 15, the respective spokes 25 are also formed into final shape. Figure 4 shows by dotted lines how the spokes 25 of the respective trim rings 14—14 appear when shaped into final form.

It will be understood that while for the purpose of simplified diagrammatic illustration I have shown the rolled section at the top of the sheet and the slit sections in the middle of the sheet, the order of the steps of rolling and slitting can be interchanged insofar as this claimed invention is concerned. In other words, for example, it may be more economical, from a manufacturing standpoint to perform the slitting operations first on flat stock and to then roll the sections into the desired curved configurations; the principal feature of the invention residing, however, in the manner in which the intermediate ring portion is slit during the slitting operation.

It will be appreciated that this method of making trim rings greatly minimizes material losses, as every bit of strip material may be utilized in such an operation.

It will be understood that modifications and variations may be effected without departing from the scope of the novel concepts of the present invention.

I claim as my invention:

1. In a method of making opposite ornamental spoke wheel trim sections from the margins of a common band, the steps of longitudinally slitting an intermediate portion of the band between its edges along a path comprising alternating joined transverse and longitudinal slits to separate the band into a series of longitudinal trim sections with alternate portions formed between the sections as oppositely projecting free ended transverse spoke blanks, one set projecting in one direction from each section and the other set in an opposite direction from the adjoining other section and slitting each section between the spoke blanks toward the edge of the same section with a series of pairs of generally radial slits beyond the extremities of the severed spoke blanks on the other adjoining section to provide trim retaining finger blanks.

2. In a method of making a circular wheel trim, the steps of forming stock into an annular ring with a cross-sectional shape such that its margins are curved radially outwardly, slitting the intermediate portion of said ring between said margins separating said ring into two trim sections, and periodically transversely slitting the intermediate portion of each section to form circumferentially spaced finger blanks.

3. In a method of making a circular wheel trim, the steps of forming stock into an annular ring with a cross-sectional shape such that its margins are curved radially outwardly, slitting the intermediate portion of said ring between said margins separating said ring into two trim sections, periodically transversely slitting the intermediate portion of each section to form circumferentially spaced finger blanks, and forming each of said finger blanks into a gripping extremity.

4. In a method of making an ornamental circular s- shaped spoked wheel trim, the steps of forming stock into an annular ring with a cross-sectional shape such that its margins are curved and arched radially outwardly and terminating in opposite edges, slitting the intermediate portion of said ring between said edges separating said ring into two trim sections, periodically transversely slitting the intermediate portion of each section forming alternating circumferentially spaced spoke blanks and finger blanks, and bending and arching the spoke blanks with respect to the finger blanks to project them in a generally radial direction while forming the finger blanks into resiliently deflectable fingers arranged in a common circle on the trim ring for retaining the wheel trim upon the wheel.

5. In a method of making two trim rings each for self retention upon a vehicle wheel and formed from an annular band, the steps of cutting the band about its circumference by transversely slitting an intermediate band area cutting out transverse portions extending transversely of the margins of the band while contemporaneously cutting and severing each of the transverse portions until the band is separated into two trim ring blanks each having a continuous area of tongues along one edge of the trim ring blank, bending and angling the tongues with respect to one another and forming a predetermined number of the tongues into retaining extensions which retaining extensions are arranged in a common circle for resilient deflection into and out of retaining cooperation with a vehicle wheel.

6. In a method of making two spoked trim rings each for self retention upon a vehicle wheel from an annular band, the steps of cutting the band about its circumference by transversely slitting an intermediate band area cutting out transverse portions linking the margins of the band while cutting and severing each of the transverse portions until the band is separated into two trim ring blanks each having a continuous area of alternating tongues of shorter and longer lengths along one edge of the trim ring blank, bending and angling the tongues with respect to one another and forming the shorter tongues into retaining extensions which retaining extensions are arranged in a common circle for retaining cooperation with a vehicle wheel.

References Cited in the file of this patent

UNITED STATES PATENTS

| | | |
|---|---|---|
| 1,830,819 | Wishmeier | Nov. 10, 1931 |
| 2,069,068 | Horn | Jan. 26, 1937 |
| 2,196,020 | Lyon | Apr. 2, 1940 |
| 2,420,320 | Lyon | May 13, 1947 |
| 2,660,479 | Lyon | Nov. 24, 1953 |